US009856143B2

(12) United States Patent
Bruce et al.

(10) Patent No.: US 9,856,143 B2
(45) Date of Patent: Jan. 2, 2018

(54) PRESSURE CONTROLLED DROPLET SPRAYING (PCDS) METHOD FOR FORMING PARTICLES OF COMPOUND MATERIALS FROM MELTS

(75) Inventors: Allan James Bruce, Scotch Plains, NJ (US); Sergey Frolov, Murray Hill, NJ (US); Michael Cyrus, Summit, NJ (US)

(73) Assignee: SUNLIGHT PHOTONICS INC., South Plainfield, NJ (US)

( * ) Notice: Subject to any disclaimer, the term of this patent is extended or adjusted under 35 U.S.C. 154(b) by 279 days.

(21) Appl. No.: 13/370,656

(22) Filed: Feb. 10, 2012

(65) Prior Publication Data

US 2012/0156384 A1 Jun. 21, 2012

Related U.S. Application Data

(63) Continuation of application No. 12/253,608, filed on Oct. 17, 2008, now abandoned.

(51) Int. Cl.
*B05D 1/02* (2006.01)
*C01B 19/00* (2006.01)
*B05B 7/16* (2006.01)

(52) U.S. Cl.
CPC .......... *C01B 19/002* (2013.01); *B05B 7/1606* (2013.01); *B22F 2999/00* (2013.01)

(58) Field of Classification Search
CPC .................................................... B05B 7/1606
USPC ...................................................... 427/421.1
See application file for complete search history.

(56) References Cited

U.S. PATENT DOCUMENTS

| | | | | |
|---|---|---|---|---|
| 3,921,859 | A * | 11/1975 | Colombani | 222/204 |
| 3,978,510 | A | 8/1976 | Kasper et al. | |
| 4,181,256 | A * | 1/1980 | Kasagi | 239/81 |
| 4,652,332 | A | 3/1987 | Ciszek | |
| 4,740,386 | A | 4/1988 | Cheung | |
| 5,441,897 | A | 8/1995 | Noufi et al. | |
| 5,626,688 | A | 5/1997 | Probst et al. | |
| 6,258,620 | B1 | 7/2001 | Morel et al. | |
| 6,493,484 | B1 | 12/2002 | Deri et al. | |
| 6,574,406 | B2 * | 6/2003 | Ainslie et al. | 385/123 |

(Continued)

FOREIGN PATENT DOCUMENTS

| | | |
|---|---|---|
| DE | 3913649 | 1/1991 |
| JP | 9326499 | 12/1997 |

(Continued)

OTHER PUBLICATIONS

Nachman and Lundin "Vapor Pressure of Praseodymium and Neodymium" Rare Earth Research, vol. 1, p. 163 (1962).

(Continued)

*Primary Examiner* — Alexander Weddle
(74) *Attorney, Agent, or Firm* — Mayer & Williams, PC; Stuart H. Mayer

(57) ABSTRACT

A method and apparatus of forming compositionally homogeneous particles is provided. The method includes forming a homogenous melt from a plurality of constituent materials under a first pressure sufficient to prevent substantial vaporization of the constituent materials. Droplets are generated from the homogenous melt. The droplets are cooled under a second pressure sufficient to prevent substantial vaporization of the constituent materials at least until the homogeneous particles formed therefrom have stabilized.

12 Claims, 2 Drawing Sheets

(56) References Cited

U.S. PATENT DOCUMENTS

| | | | | |
|---|---|---|---|---|
| 6,613,162 | B1 * | 9/2003 | Dutta et al. | 148/512 |
| 7,026,258 | B2 | 4/2006 | Taunier et al. | |
| 2001/0005556 | A1 * | 6/2001 | Kobayashi et al. | 428/614 |
| 2003/0178104 | A1 * | 9/2003 | Sekine | 148/302 |
| 2003/0219544 | A1 | 11/2003 | Smith | |
| 2004/0148966 | A1 | 8/2004 | Celikkaya et al. | |
| 2005/0183768 | A1 | 8/2005 | Roscheisen et al. | |
| 2006/0008928 | A1 | 1/2006 | Beppu et al. | |
| 2006/0210640 | A1 | 9/2006 | Kerkhof | |
| 2008/0038555 | A1 | 2/2008 | Sekine et al. | |
| 2008/0041532 | A1 | 2/2008 | Chou et al. | |
| 2008/0175982 | A1 | 7/2008 | Robinson et al. | |
| 2008/0179033 | A1 * | 7/2008 | Forbes Jones | B22F 9/14<br>164/46 |
| 2008/0226270 | A1 | 9/2008 | Wendt et al. | |

FOREIGN PATENT DOCUMENTS

| | | |
|---|---|---|
| JP | 2007096031 | 4/2007 |
| KR | 100246712 | 3/2000 |

OTHER PUBLICATIONS

Peter T. Erslev et al. "Study of the Electronic Properties of Matched Na-containing and Na-free CIGS samples using Junction Capacitance Methods", Publication date unknown, but prior tot he filing date of the instant application, 6 pgs., (2007).

D. Bremaud et al. "Towards the Development of Flexible CIGS Solar Cells on Polymer Films with Efficiency Exceeding 15%", Publication date unknown, but prior tot he filing date of the instant application, 4 pgs., (2005).

PK Johnson et al. "A comparative Study of Defect States in Evaporated and Selenized CIGS(S) Solar Cells", Publication date unknown, but prior tot he filing date of the instant application, pp. 1-17, (2005).

Gregory M. Hanket et al. "Growth of Cu(InGa)(SeS)2 by the Reaction of Cu—Ga—In Precursors in H2Se and H2S", University of Delaware, Institute of Energy Conservation, Publication date unknown, but prior tot he filing date of the instant application, 2 pgs.

T. Pisarkiewicz et al., "Fabrication of thin film polycrystalline CIS photovoltaic hetrostructure", Opto-Electron. Rev., vol. 11, No. 4, (2003), pp. 297-304.

Rommel Noufi and Ken Zweibel, "High-Efficiency COTE and CIGS Thin-Film Solar Cells: Highlights and Challenges", National Renewable Energy Laboratory, Golden, CO., Publication date unknown, but prior to the filing date of the D instant application, 4pgs., (2006).

B. von Roedern et ai, "Polycrystalline Thin-Film Photovoltaics: From the Laboratory to Solar Fields", May 2006, 7 National Renewable Energy Laboratory, Golden, CO., pp. 1-4.

M. Raja Reddy, "Thin film solar cells for low cost space applications", European Space Agency, Dec. 1998, pp. 2-41.

Roecker, R., Spray Technology, Brochure 003, Southwest Research Institute, 1998,4 pages.

Eberspacher, C. et al., "Thin-film CIS alloy PV materials fabricated using non-vacuum, particles-based techniques," Thin Solid Films 387 (2001), pp. 18-22.

* cited by examiner

10 MELTING VESSEL → HOMOGENEOUS MELT → 20 DROPLET GENERATION VEHICLE → DROPLETS → 30 PARTICLE GENERATION VEHICLE

- 310 — DESIGN COMPOSITION AND SELECT CONSTITUENTS
- 320 — COMBINE AND MELT BATCH
- 330 — MELT DELIVERY AND DROPLET GENERATION
- 340 — PARTICLE GENERATION IN CONTROLLED ENVIRONMENT
- 350 — CAPTURE AND OPTIONAL CLASSIFICATION OF PARTICLES

PRESSURE CONTROLLED DROPLET SPRAYING (PCDS) METHOD FOR FORMING PARTICLES OF COMPOUND MATERIALS FROM MELTS

CROSS-REFERENCE TO RELATED APPLICATION

This application is a continuation of U.S. application Ser. No. 12/253,608, filed Oct. 17, 2008, entitled A PRESSURE CONTROLLED DROPLET SPRAYING (PCDS) METHOD FOR FORMING PARTICLES OF COMPOUND MATERIALS FROM MELTS. This application is also related to commonly assigned, co-pending U.S. patent application Ser. No. 12/185,369, entitled "A Reacted Particle Deposition (RPD) Method for Forming a Compound Semi-Conductor Thin-film, filed Aug. 4, 2008, which is incorporated by reference herein in its entirety.

FIELD OF INVENTION

The present invention relates to a method of forming particles, including nanoparticles, of compound materials with controlled composition.

BACKGROUND OF THE INVENTION

The formation and properties of nanoparticles are areas of intense scientific research, having a wide variety of potential applications in biomedical, optical, electronic and structural material fields. Particles, with dimensions between 1-100 nanometers (nm) are typically identified as nanoparticles. The properties of nanoparticles fall in the range between those of bulk materials and atomic or molecular structures. While a bulk material typically exhibits constant physical properties regardless of its size, the properties of materials can change as the size of a material body approaches nanoscale. Examples of such size-dependent behavior include quantum confinement in semiconductor particles, surface plasmon resonance in some metal particles and superparamagnetism in magnetic materials. In recent years, the adjustable properties of nanoparticles have increasingly been exploited in many fields in order to engineer enhanced solutions and products.

One feature of nanoparticles is that they have a very high surface area to volume ratio. This can also provide a strong driving force for diffusion, especially at elevated temperatures. Sintering can therefore take place at lower temperatures, over shorter time scales than for larger particles. The large surface area to volume ratio can also reduce the incipient melting temperature of the material in nanoparticle form.

Nanoparticles may be used as discrete components, usually in a dispersing medium, or as precursors for forming larger bodies including thin films. In the latter case nanoparticles might be dispersed in a carrier and then coated onto a substrate as an ink. This coating can be dried, reacted and, or densified to form a desired film. The noted advantages of nanoparticles including enhanced diffusion and lower melting and sintering temperatures may be used advantageously in the fabrication of such engineered bodies including films.

A variety of methods have been demonstrated for forming nanoparticles including; attrition of macro materials, flame pyrolysis, plasma spraying, gas aggregation and precipitation methods.

In attrition, macro scale particles are ground in a ball mill, or other size reducing apparatus. The resulting particles are then classified to separate nanoparticles. Ball-milling is sometimes considered a "dirty" process because of a potential for contamination from the ball-milling components and processes. However, with the introduction of wear resistant components, e.g made of tungsten carbide, and better process control such impurities can be reduced to acceptable levels for many applications. Attrition methods commonly produce nanoparticles with a broad size distribution. Typical of a top-down approach, the average particle size decreases with longer processing time. For given manufacturing objectives, including cost or rate of production, the processing time required to achieve very small nanoparticles may become restrictive.

In flame pyrolysis, a liquid, gas, solution or mixed precursor is typically forced through an orifice at high pressure and burned in a combustible gas flame. The resulting product is classified to recover nanoparticles from by-product gases. Flame pyrolysis often produces aggregates rather than individual nanoparticles.

In plasma spraying nanoparticles are formed by injecting feedstock materials into the jet of a plasma torch where they can be evaporated and then quenched on exiting the plasma Plasma temperatures can approach 10000 K and a wide range of feedstocks including powders can be processed. The residence time of the material in the plasma is typically very short, so it is important that the starting feedstock dimensions are small enough to ensure complete evaporation. During processing, the plasma does not contact the electrodes, thus avoiding a possible source of contamination and permitting the use of a wide range of inert, reducing or oxidizing atmospheres. RF plasma methods have been used to make ceramic nanoparticles such as oxides, carbides and nitrides of Ti and Si.

Gas aggregation has been used to make nanoparticles of low melting point elements and in particular metals. Typically, the metals are melted and vaporized in a vacuum chamber and the vapor is fed into an inert gas stream where it is supercooled and condensed to form nanoparticles. These nanoparticles are entrained in the gas stream and may be collected or directly deposited therefrom.

Precipitation methods including sol-gel methods are also widely used and documented. Addressable compositions are restricted by the availability of suitable precursor materials.

A common limitation of the flame pyrolysis, plasma spraying and gas aggregation methods for nanoparticle formation is a difficulty in achieving compositional control which precludes the possibility of appropriately processing of compound nanoparticles which are comprised of multiple elements which exhibit significantly different tendencies to vaporize, or separate, during processing. This also limits their usefulness for applications where it is highly beneficial, or essential, to achieve precise compositional control of the nanoparticles.

In summary, the field of nanoparticle formation and application is still in an evolutionary phase. One limiting factor is the difficulty in forming nanoparticles of materials which exhibit a preferred loss of constituents during processing. New methods which can provide enhanced compositional control are highly desirable.

In the context of droplet spraying, U.S. patents, patent applications and other publication describing the design and application of nozzles for spraying and/or particle generation, including molten metal droplet spraying (U.S. Pat. No. 4,181,256 issued to Kasagi), solution droplet spraying (U.S. Patent Application No. 20060210640 issued to Kerkhof and U.S. Patent Application No. 20080041532 issued Chou et al.), vapor mixture spraying (U.S. Patent Application No.

20080226270 issued to Wendt et al.) and fuel injection (Roecker, R., "Spray Technology", Brochure D03, SouthWest Research Institute, (1998), provide some background information on nozzles and spraying.

In the context of compound nanoparticles which will be addressable by method described herein and their applications, a method of employing nanoparticles of fully reacted compound semiconductor materials is described in commonly assigned, co-pending U.S. patent application Ser. No. 12/185,369, entitled "A Reacted Particle Deposition (RPD) Method for Forming a Compound Semi-Conductor Thin-film, filed Aug. 4, 2008. None of the references or techniques cited above provides a suitable method for generating such compound semiconductor nanoparticles.

SUMMARY OF THE INVENTION

In accordance with the present invention, a method and apparatus of forming compositionally homogeneous particles is provided. The method includes forming a homogenous melt from a plurality of constituent materials under a first pressure sufficient to prevent substantial vaporization of the constituent materials. Droplets are generated from the homogenous melt. The droplets are cooled under a second pressure sufficient to prevent substantial vaporization of the constituent materials at least until the homogeneous particles formed therefrom have stabilized.

In accordance with one aspect of the invention, the homogenous particles may comprise nanoparticles.

In accordance with another aspect of the invention, the homogenous melt may be formed above its liquidus temperature.

In accordance with one aspect of the invention, the first pressure may arise from an inert gas.

In accordance with one aspect of the invention, the second pressure may arise from an inert gas.

In accordance with one aspect of the invention, the second pressure may arise from a reactive gas.

In accordance with one aspect of the invention, generating the droplets may further comprise mixing the homogenous melt with a high pressure inert gas stream while maintaining the homogeneous melt at an elevated temperature at least until the droplets are formed.

In accordance with one aspect of the invention, generating the droplets may be performed using a spray nozzle.

In accordance with one aspect of the invention, the forming, generating and cooling steps may be performed in a melting vessel, droplet generation vehicle and particle generation vehicle, respectively.

In accordance with one aspect of the invention, the temperature may be controlled and monitored in the melting vessel, droplet generation vehicle, or the particle generation vehicle.

In accordance with one aspect of the invention, the temperature may be controlled and monitored in the melting vessel, droplet generation vehicle and the particle generation vehicle.

In accordance with one aspect of the invention, the pressure may be controlled and monitored in the melting vessel, droplet generation vehicle, or the particle generation vehicle.

In accordance with one aspect of the invention, the pressure may be controlled and monitored in the melting vessel, droplet generation vehicle and the particle generation vehicle.

In accordance with one aspect of the invention, gas composition may be controlled and monitored in the melting vessel, droplet generation vehicle, or the particle generation vehicle.

In accordance with one aspect of the invention, gas composition may be controlled and monitored in the melting vessel, droplet generation vehicle, and the particle generation vehicle.

In accordance with one aspect of the invention, the homogeneous melt may be formed from a solid body that is melted in a droplet generation vehicle that generates the droplets.

In accordance with one aspect of the invention, the homogenous melt may be siphoned from the melting vessel to the droplet generation vehicle.

In accordance with one aspect of the invention, the homogenous melt may be transported from the melting vessel to the droplet generation vehicle by a gravitational feed extending from the melting vessel.

In accordance with one aspect of the invention, the homogenous melt may be transported from the melting vessel to the droplet generation vehicle by a pressurized feed extending from the melting vessel.

In accordance with another aspect of the invention, a method is provided for forming compositionally homogeneous layers. The method includes forming a homogenous melt from a plurality of constituent materials under a first pressure sufficient to prevent substantial vaporization of the constituent materials. Droplets are generated from the homogenous melt. The droplets are applied to a substrate under a second pressure sufficient to prevent substantial vaporization of the constituent materials so that a homogenous layer is formed.

In accordance with another aspect of the invention, the droplets may be applied to the substrate so that a plurality of homogenous layers is formed.

In accordance with another aspect of the invention, the plurality of homogenous layers may form a preform structure.

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components and circuits have not been described in detail, so as not to obscure the following description. Further, the embodiments disclosed are for exemplary purposes only and other embodiments may be employed in lieu of, or in combination with, the embodiments disclosed.

As detailed below, a so-called Pressure Controlled Droplet Spraying (PCDS) technique is provided for the fabrication of particles, including but not limited to nanoparticles.

The particles are formed from compound materials and have a controlled composition. Among other things, the method can overcome the limitations in compositional control that is encountered in commonly practiced methods for particle formation such as flame pyrolysis, plasma spraying and gas aggregation. Furthermore, the PDS technique can enable the formation of new compositions of particles, including nanoparticles, and new applications which derive therefrom. Although the technique is also applicable to larger particles, the focus of this discussion will be on nanoparticles.

Figure 1:
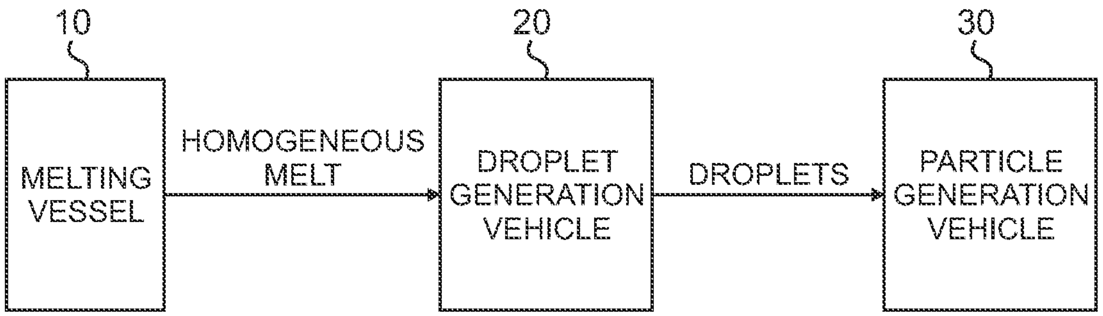
FIG. 1 is a simplified schematic diagram illustrating the components of an apparatus for performing a Pressure Controlled Droplet Spraying (PCDS) method.

FIG. 1 is a simplified schematic diagram illustrating a melting vessel 10, droplet generation vehicle 20, and a particle generation vehicle 30 in which the techniques of the present invention may be performed. While these components are illustrated as physically distinct elements for purposes of illustration, those of ordinary skill in the art will recognize that the functions performed by each component may be combined or divided into any number physical elements.

A batch of the desired compound material or constituent sub-compounds, elements or other suitable precursors is mixed and melted in the melting vessel 10 to form a homogeneous melt at a temperature above its liquidus temperature. The melt is maintained under an atmosphere of an inert gas or other vapor, which is at a sufficient pressure to suppress significant loss by vaporization of the sub-compounds or other by-products of the compound, after initial melt-vapor equilibrium is achieved. Furthermore, it is desirable that the melting temperature be sufficient for the melt to achieve a sufficiently low viscosity so that it can be transported through a siphoning tube or other appropriate delivery vehicle. It is also desirable that the material from which the melting vessel 10 is formed have a low reactivity with the melt during processing in order to minimize the possibility of contamination. The melting vessel 10 and/or the materials therein may be heated by any number of conventional techniques including resistive heating or induction heating. Furthermore, the melting vessel 10 may itself act as the pressurized container or may be contained within an outer vessel which is pressurized.

The droplet generation vehicle 20 generates droplets, as small as nano-size, from the melt in the melting vessel 10. In some embodiments the droplet generation vehicle 20 may comprise a spray nozzle in which droplets are generated by mixing a stream of the melt with a high-pressure stream of inert gas or other appropriate carrier. Such nozzles can be similar in form to those used in other spraying applications, provided that they are formed from materials that are able to withstand elevated temperatures. The temperature of the droplet delivery vehicle 20 during processing should be high enough to permit the delivery of the melt until the point of droplet formation without detrimental cooling. The materials used for constructing the delivery vehicle should withstand the processing conditions including the temperatures employed and preferably have a low-reactivity with the melt during processing in order to reduce the possibility of contamination.

The droplets formed by the droplet generation vehicle 20 are cooled and solidified in the particle generation vehicle without significant loss of constituents. This approach is quite different from particle generation from a solution or a dispersed medium in which the loss of a solvent or dispersing fluid from the droplets (i.e., a "drying" process) is an essential part of the particle formation process. The atmospheric pressure surrounding the droplets in the droplet generation vehicle 20 should be sufficient to suppress loss of material by volatilization of the sub-compounds or other constituents, at least up to the point where the droplet composition is stabilized by cooling. Typically, consistent with a flow condition, this pressure will be lower than the inlet pressure from a droplet delivery apparatus or other input device that transfers the droplets form the droplet generation vehicle 20 to the particle generation vehicle 30. The temperature, or temperature gradient, within the particle generation vehicle 30 should be sufficient to insure that the material remains molten through the critical phase of droplet formation and entry into the particle generation vehicle 30.

Figure 2:
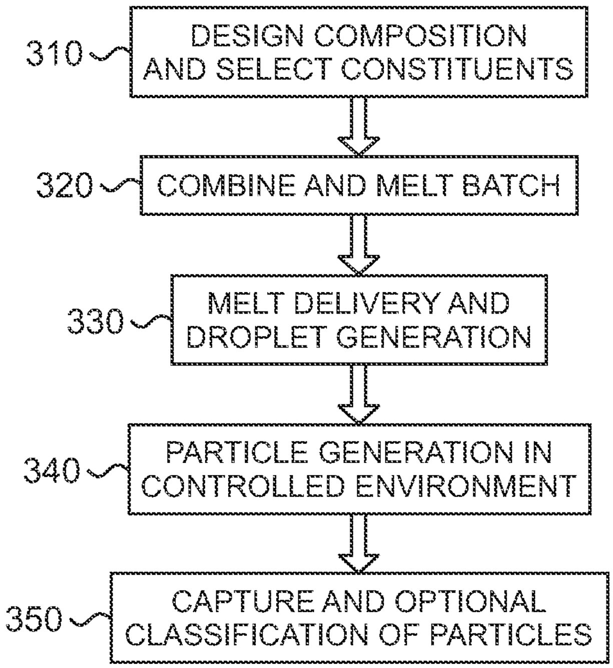
FIG. 2 is a flowchart illustrating one example of a PCDS method.

FIG. 2 is a flowchart illustrating one example of the PCDS method described above. The method includes the compositional design and selection of the constituent materials (step 310) and the mixing and melting of the constituent materials in a suitable vessel (step 320). The resulting melt is delivered to a droplet generation vehicle (step 330). Particles are then generated under suitable environmental conditions which provide compositional control (step 340). The particle are then collected and, optionally, classified according to size (step 350).

Figure 3:
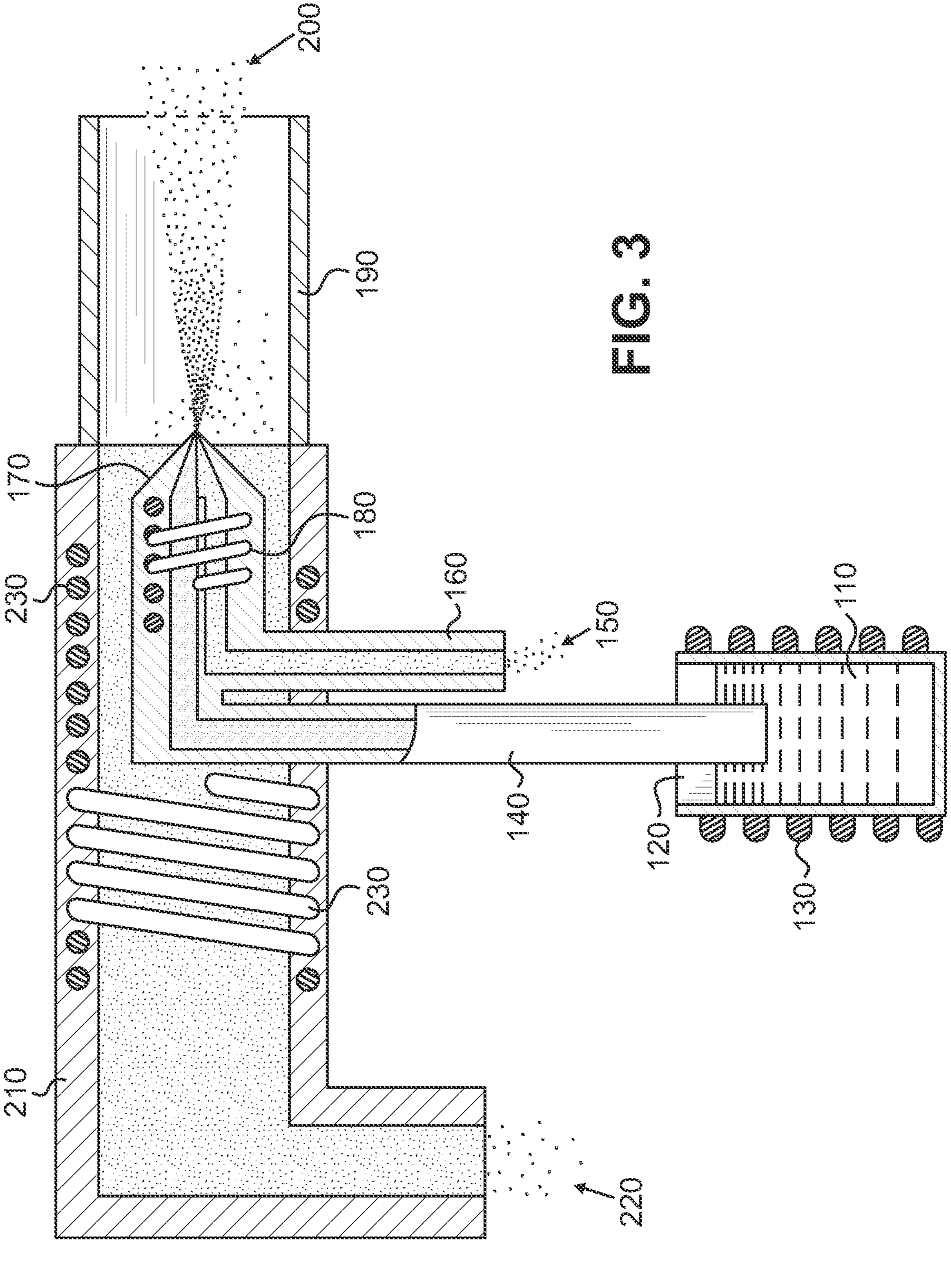
FIG. 3 depicts an example of an apparatus for implementing a PCDS method.

FIG. 3 depicts an example of an apparatus for implementing a PCDS method, which is schematically illustrated in FIG. 1. A homogeneous melt 110 is contained in a vessel 120 which is heated by an external heater 130. A delivery apparatus, which in this case is comprised of a siphoning tube 140 and includes an aspirating gas stream (150) fed through another supply tube 160, is used to deliver the melt through a nozzle 170. The melt and gas stream are combined and forced through the nozzle 170, which may be heated by an external heater 180. A droplet stream is produced and directed into a pressurized particle generation chamber 190. A particle stream 200 that is produced when the droplets cool may be entrained in a gas stream 220 supplied through a surrounding manifold 210, which is heated by an external heater 230.

As previously mentioned, the nozzle 170 may be similar in form to those used in other spraying applications, provided that they are formed from materials that are able to withstand elevated temperatures. In addition, the size and configuration of the nozzle may be adjusted to produce appropriately sized droplets, facilitating the flow of the melt through the vehicle and the mixing of the melt in an appropriate ratio with the dispersing gas. Furthermore the rates of dispersing gas flow may be adjusted in order to facilitate the formation and transport of droplets of a given size from the nozzle. Such modifications are within the purview of those of ordinary skill in the art.

Optionally, the above identified components of the apparatus shown in FIG. 3 may be integrated into one monolithic unit or used as discrete interconnected but separately operated parts.

Optionally, a separate carrier stream of gas may be delivered through, or around, the nozzle 170 to entrain the droplets and/or the resulting particles. This stream should be of appropriate temperature and pressure so that the generation and processing of the droplet stream is not detrimentally impacted.

Optionally, the composition of the atmosphere in the particle generation vehicle 30 may be inert or reactive. The latter option can enable reactions at the surface of the droplets, which may introduce or enhance desired features in the resulting particles. For example, a suitable reactive gas or gases can facilitate the formation of an optically or electrically enhanced surface layer, enhanced chemical reactivity, anti-agglomeration behavior or enhanced environmental stability.

The PCDS method as described above differs significantly from the droplet spraying techniques employed in the aforementioned references to Kasagi, Kerkhof, Chou et al., Wendt et al. and Roeker. For instance, none of these references attempt to actively control, through control of atmospheric pressure, the composition of the droplets and the resulting particles, which is one important element of the PCDS method. In addition, these references do not attempt to control the composition of the particles when they are formed from melts that are prone to compositional changes due to the selective vaporization of the constituent materials. An example of such materials is a II-VI compound semiconductor. In Kasagi, only single composition metals are employed, which of course will not exhibit compositional changes.

The solution droplet spraying methods described in both Kerkhof and Chou et al. differ in several additional ways from the PCDS method described above. In these references, the feedstocks are solutions of materials dissolved in a solvent. The droplets that are formed undergo a drying process, whereby the solvent is evaporated and the dissolved materials form salt residues or similar aggregates. Moreover, these salts need not be compositionally homogeneous or fully reacted compounds. By contrast, the feedstocks employed in the PCDS method are homogeneous melts which generally have been reacted above their liquidus temperature. These feedstock are therefore well-suited to form a homogenous, chemically reacted compound material upon cooling. Depending on the cooling regime, the resulting particles may also be amorphous, polycrystalline or crystalline in nature.

In Roeker, the droplet spraying of fuels results in a dispersion of combustable droplets which are pyrolysed in the vapor phase and do not lead to the formation of nanoparticles. Any pressurization arising during fuel injection is an artifact of the desire to form combustable gas mixtures, rather than a desire to suppress a loss of materials from the droplets.

The droplet spraying methods cited above also do not address the application of such methods to the high temperatures appropriate for many compound materials, nor for droplet formation down to nanoparticle size. Furthermore, when solution spraying is employed to form particles, the initial droplets, which also contain a solvent that is later removed by drying, can be substantially larger than the final particles. There is no analogous size reduction mechanism for melt droplets when the PCDS method is employed.

In some embodiments of the invention, instead of forming particles such as nanoparticles, the PCDS technique may be used to form compositionally homogeneous layers on a substrate. In this case, after the droplets are generated they are applied to a substrate while under a sufficient pressure to prevent substantial vaporization of the constituent materials so that a homogenous layer is formed on the substrate upon cooling. In some implementations this technique may be used to build up a structure (e.g., a fiber preform) in a layer-by-layer manner.

EXAMPLES

For the purpose of illustration, the PCDS method as described hererin may be applied to compound semiconductor materials, which are useful for the fabrication of electrooptic devices. This should not be considered as a limitation in the scope of the invention but is simply used to illustrate a group of materials which are prone to the selective loss of constituents during processing and which would benefit from the compositional control provided by the PDS method. One sub-group of materials within this domain are Cu—In—Se (CIS) compound semiconductors and related alloys, which are of interest for use as absorbers in Photovoltaic (PV) solar cells. Non-vacuum methods of CIS film formation have been reported by many authors including Eberspacher et al. (Eberspacher, C., Frederic, C. Pauls, K. and Serra, J., Thin Solid Films 387, 18, 2001) and are an area of great commercial interest. Because of compositional control issues in nanoparticle processing, the nanoparticles used in these approaches are typically comprised only of constituent metals and require additional processing to form the compound semiconductor.

Fully reacted compound semiconductor particles and materials of the type formed by the PCDS method described herein may be used for a variety of purposes. As previously mentioned, such particles and materials may be advantageously employed in the method for forming compound semiconductor thin films described in co-pending U.S. patent application Ser. No. 12/185,369.

The invention claimed is:

1. A method of forming compositionally homogeneous layers, comprising:
- forming a homogeneous melt from a plurality of constituent materials that have different vaporization rates, the homogeneous melt being formed under a first pressure sufficient to prevent compositional changes in the homogeneous melt due to selective vaporization of the constituent materials, wherein the constituent materials are compound semiconductor materials;
- generating droplets from the homogeneous melt; and
- applying the droplets to a substrate under a second pressure sufficient to prevent substantial compositional changes in the droplets due to selective vaporization of the constituent materials so that a homogeneous layer is formed upon cooling.

2. The method of claim 1 further comprising applying the droplets to the substrate under the second pressure so that a plurality of homogeneous layers is formed.

3. The method of claim 2 wherein the plurality of homogeneous layers forms a preform structure.

4. The method of claim 1 wherein the homogeneous melt is formed above its liquidus temperature.

5. The method of claim 1 wherein the first pressure arises from an inert gas.

6. The method of claim 1 wherein the second pressure arises from an inert gas.

7. The method of claim 1 wherein the second pressure arises from a reactive gas.

8. The method of claim 1 wherein generating the droplets further comprises mixing the homogeneous melt with an inert gas stream while maintaining the homogeneous melt at a specified temperature at least until the droplets are formed.

9. The method of claim 1 wherein generating the droplets is performed using a spray nozzle.

10. The method of claim 1 wherein the homogeneous melt is formed from a solid body that is melted in a droplet generation vehicle that generates the droplets.

11. The method of claim 1 further comprising transferring the homogeneous melt from a melting vessel to a droplet generation vehicle using a gas pressure differential.

12. A method of forming compositionally homogeneous layers, comprising:
- mixing in a melting vessel a plurality of constituent materials that have different vaporization rates, wherein the constituent materials are compound semiconductor materials;

forming a homogeneous melt from the plurality of constituent materials, the homogeneous melt being formed under a first pressure sufficient to prevent compositional changes in the homogeneous melt due to selective vaporization of the constituent materials;

generating droplets from the homogeneous melt; and applying the droplets to a substrate under a second pressure sufficient to prevent substantial compositional changes in the droplets due to selective vaporization of the constituent materials so that a homogeneous layer is formed upon cooling.

* * * * *